(12) United States Patent
Jeong et al.

(10) Patent No.: US 10,326,928 B2
(45) Date of Patent: Jun. 18, 2019

(54) IMAGE PROCESSING APPARATUS FOR DETERMINING WHETHER SECTION OF TARGET AREA MATCHES SECTION OF PERSON AREA AND CONTROL METHOD THEREOF

(71) Applicant: SAMSUNG ELECTRONICS CO., LTD., Suwon-si, Gyeonggi-do (KR)

(72) Inventors: Ha-wook Jeong, Seoul (KR); Beom-su Kim, Seoul (KR); Sun-jung Kim, Suwon-si (KR); Hong-il Kim, Yongin-si (KR); Tae-hwa Hong, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 249 days.

(21) Appl. No.: 15/397,992

(22) Filed: Jan. 4, 2017

(65) Prior Publication Data

US 2017/0201676 A1 Jul. 13, 2017

(30) Foreign Application Priority Data

Jan. 8, 2016 (KR) .................. 10-2016-0002840

(51) Int. Cl.
| | |
|---|---|
| *H04N 5/222* | (2006.01) |
| *H04N 5/232* | (2006.01) |
| *G06T 7/143* | (2017.01) |
| *G06T 7/11* | (2017.01) |
| *G06T 7/13* | (2017.01) |
| *G06T 7/149* | (2017.01) |
| *H04N 5/225* | (2006.01) |

(Continued)

(52) U.S. Cl.
CPC ........... *H04N 5/23216* (2013.01); *G06T 7/11* (2017.01); *G06T 7/13* (2017.01); *G06T 7/143* (2017.01); *G06T 7/149* (2017.01); *G06T 7/194* (2017.01); *H04N 5/2258* (2013.01); *H04N 5/23293* (2013.01); *G06T 2207/20076* (2013.01); *G06T 2207/20081* (2013.01); *G06T 2207/20104* (2013.01); *G06T 2207/30196* (2013.01); *H04N 5/23219* (2013.01); *H04N 5/2621* (2013.01)

(58) Field of Classification Search
CPC .................................................. H04N 5/23216
See application file for complete search history.

(56) References Cited

U.S. PATENT DOCUMENTS

| | | |
|---|---|---|
| 6,697,502 B2 | 2/2004 | Luo |
| 8,379,101 B2 | 2/2013 | Mathe et al. |
| 8,823,834 B2 | 2/2014 | Yamaoka et al. |

(Continued)

FOREIGN PATENT DOCUMENTS

| | | |
|---|---|---|
| CN | 102521582 | 9/2013 |
| WO | WO 2009/078957 | 6/2009 |
| WO | WO 2009/109127 | 9/2009 |

*Primary Examiner* — Gary C Vieaux
(74) *Attorney, Agent, or Firm* — Nixon & Vanderhye P.C.

(57) ABSTRACT

Disclosed is an image processing apparatus including: a storage configured to store model information regarding a boundary of a person area in an image; and a controller configured to determine a boundary of a target area in an area to be processed, and to control the target area to undergo image processing for the person area if it is determined, based on the model information stored in the storage, that the determined boundary of the target area matches the boundary of the person area.

14 Claims, 11 Drawing Sheets

(51) Int. Cl.
    *G06T 7/194*    (2017.01)
    *H04N 5/262*    (2006.01)

(56) References Cited

U.S. PATENT DOCUMENTS

| | | |
|---|---|---|
| 8,885,926 B2 | 11/2014 | Seung et al. |
| 9,047,507 B2 | 6/2015 | Gurman et al. |
| 2002/0076100 A1 | 6/2002 | Luo |
| 2009/0226044 A1 | 9/2009 | Nagan et al. |
| 2010/0158325 A1 | 6/2010 | Piramuthu et al. |
| 2010/0266175 A1 | 10/2010 | Seung et al. |
| 2010/0302395 A1 | 12/2010 | Mathe et al. |
| 2011/0096922 A1* | 4/2011 | Oya .................. H04N 7/183 380/28 |
| 2011/0273592 A1 | 11/2011 | Yamaoka et al. |
| 2013/0322720 A1 | 12/2013 | Hu et al. |
| 2014/0219560 A1 | 8/2014 | Robinson |

* cited by examiner

IMAGE PROCESSING APPARATUS FOR DETERMINING WHETHER SECTION OF TARGET AREA MATCHES SECTION OF PERSON AREA AND CONTROL METHOD THEREOF

CROSS-REFERENCE TO RELATED APPLICATION

This application is based on and claims priority under 35 U.S.C. § 119 to Korean Patent Application No. 10-2016-0002840, filed on Jan. 8, 2016 in the Korean Intellectual Property Office, the disclosure of which is incorporated by reference herein in its entirety.

BACKGROUND

Field

The present disclosure relates generally to an image processing apparatus for extracting and processing a person area from an input image and a method of controlling the same.

Description of Related Art

In a smartphone or the like small digital image processing apparatus, an image sensor or a lens aperture is so small that it is virtually impossible to get a shallow depth of field for extracting only a person area from a photographed image.

In this case, the small digital image processing apparatus has to employ an infrared sensor or a stereo camera, or photograph many images successively to generate a depth map and then extract a person area.

However, the generation of the depth map has problems that a complicated photographing process using a complex photographing interface and a considerable number of operations are needed.

SUMMARY

Accordingly, an example aspect of one or more example embodiments may provide an image processing apparatus, which uses a single photographed image and conveniently and easily extracts a person area, and a method of controlling the same.

According to an aspect of an example embodiment, an image processing apparatus is provided, the image apparatus including: a storage configured to store model information regarding a boundary of a person area in an image; and a controller configured to determine a boundary of a target area in an area to be processed, and to perform image processing on the target area for the person area if it is determined, based on the model information stored in the storage, that the determined boundary of the target area matches the boundary of the person area.

The model information may be grouped according to types by learning a plurality of sample images including the person area.

The type of model information may include a pose of a person.

The model information may be provided based on a plurality of sections obtained by dividing the boundary of the person area, and the boundary of the target area may be determined based on the sections.

The controller may determine the type of model information for comparison based on a characteristic in the boundary of the target area.

The controller may preferentially determine a boundary of a section, in which the boundary has a large change in shape, from among the boundaries corresponding to the sections in the target area.

The controller may determine a pose of a person within the target area if the boundary having the large change in shape matches with the boundary of the person area.

The controller may generate a probability map regarding the target area based on the determined pose of the person in the target area, and extract the target area based on the generated probability map.

The image processing apparatus may further include a display, and the controller may select at least one among a plurality of target areas included in the image to be processed, and control the display to display a user interface for making the selected target area undergo the image processing for the person area.

According to an aspect of another example embodiment, a method of controlling an image processing apparatus is provided, the method including: storing model information regarding a boundary of a person area in an image; determining a boundary of a target area in an area to be processed; determining whether the determined boundary of the target area matches the boundary of the person area, based on the stored model information; and controlling the target area to undergo image processing for the person area based on matching results.

The model information may be grouped based on types by learning a plurality of sample images including the person area.

The type of model information may include a pose of a person.

The model information may be provided based on a plurality of sections obtained by dividing the boundary of the person area, and the boundary of the target area may be determined based on the sections.

The determining the matching may further include determining the type of model information for comparison based on a characteristic in the boundary of the target area.

The determining the matching may further include preferentially determining a boundary of a section, in which the boundary has a large change in shape, from among the boundaries corresponding to the sections in the target area.

The determining the matching may further include determining a pose of a person within the target area if the boundary having the large change in shape matches the boundary of the person area.

The method may further include: generating a probability map regarding the target area based on the determined pose of the person in the target area; and extracting the target area based on the generated probability map.

The method may further include: selecting at least one among a plurality of target areas included in the image to be processed; and displaying a user interface for making the selected target area undergo the image processing for the person area.

BRIEF DESCRIPTION OF THE DRAWINGS

The above and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Below, example embodiments will be described with reference to accompanying drawings. The following example embodiments will describe elements related to the present disclosure, and description of the other elements may be omitted. However, it will be appreciated that the elements, the descriptions of which are omitted, are not unnecessary to realize the apparatus or system according to the example embodiments.

Figure 1:
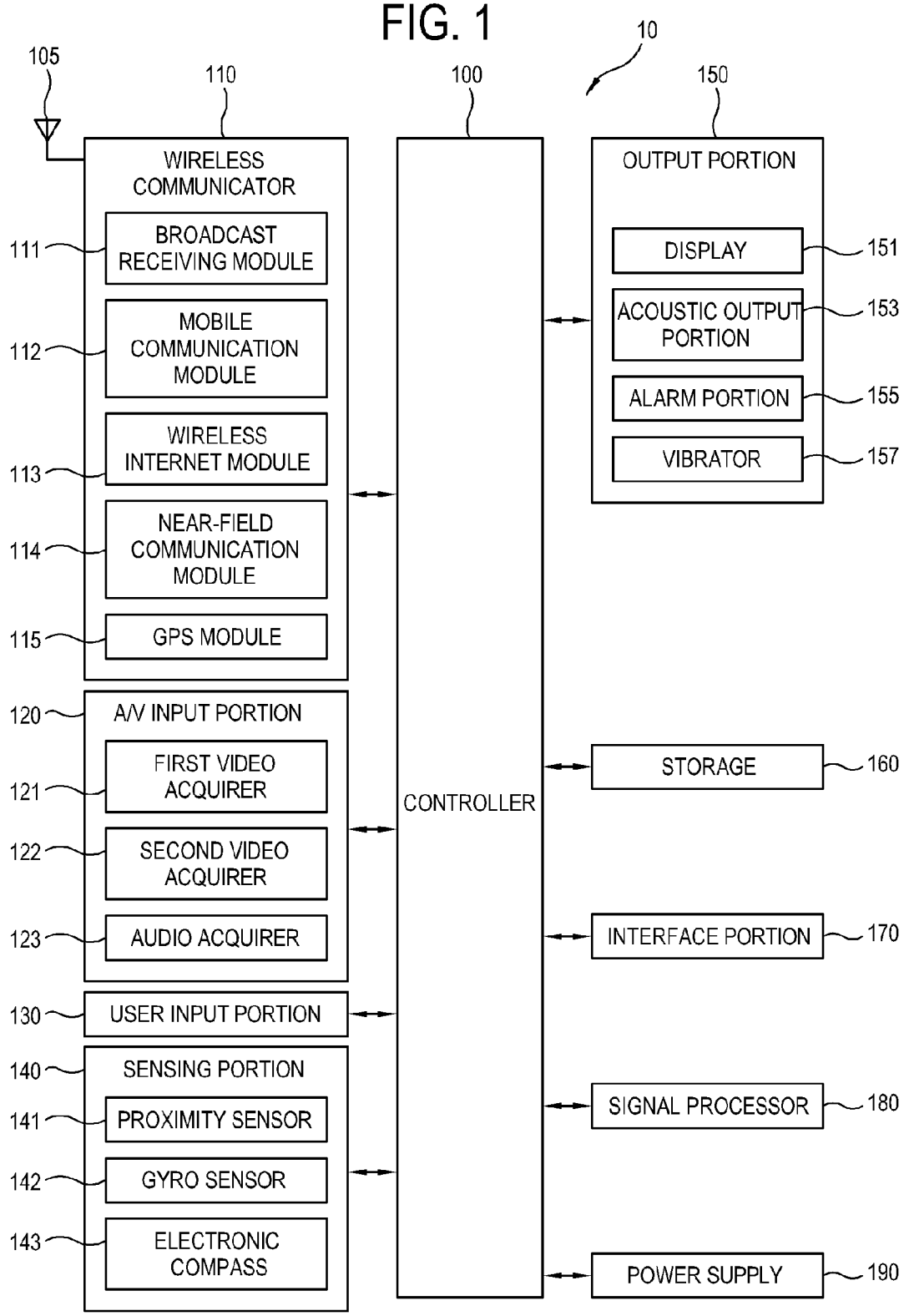
FIG. 1 is a block diagram illustrating an example image processing apparatus according to an example embodiment.

FIG. 1 is a block diagram illustrating an example image processing apparatus according to an example embodiment.

The image processing apparatus 10 may, for example, be a portable electronic apparatus such as a portable terminal, a mobile phone, a mobile pad, a media player, a tablet computer, a smart phone or a personal digital assistant (PDA), or the like, but is not limited thereto. Further, the image processing apparatus 10 may be a portable electronic apparatus where functions of two or more among them are combined.

Referring to FIG. 1, the image processing apparatus 10 may include a wireless communicator (e.g., including communication circuitry) 110, an audio/video (A/V) input portion (e.g., including A/V input circuitry) 120, a user input portion (e.g., including input circuitry) 130, a sensing portion (e.g., including at least one sensor) 140, an output portion (e.g., including output circuitry) 150, a storage 160, an interface portion (e.g., including interface circuitry) 170, a signal processor (e.g., including processing circuitry) 180, a power supply 190, and a controller (e.g., including control and/or processing circuitry) 100. When these elements are actually realized, two or more elements may be combined into one or one element may be divided into two or more elements as necessary.

The wireless communicator 110 may include various communication circuitry, such as, for example, and without limitation, a broadcast receiving module 111, a mobile communication module 112, a wireless Internet module 113, a near-field communication module 114, a global positioning system (GPS) module 115, etc.

The broadcast receiving module 111 may include circuitry that receives at least one between a broadcast signal and broadcast-related information from an external broadcast management server through a broadcast channel. The broadcast signal and/or broadcast-related received through the information broadcast receiving module 111 may be stored in the storage 160. The mobile communication module 112 may include circuitry that transmits and receives a wireless signal to and from at least one among a base station, an external terminal and a server on a mobile network. The wireless Internet module 113 may refer, for example, to a module including various circuitry for wireless Internet access. The wireless Internet module 113 may be placed inside or outside the image processing apparatus 10. The near-field communication module 114 refers to a module that includes circuitry for near-field communication. Technology for the near-field communication may include Bluetooth, radio frequency identification (RFID), infrared data association (IrDA), ultra-wideband (UWB), ZigBee, etc. The GPS module 115 may include various circuitry that receives location information from a plurality of GPS satellites.

The A/V input portion 120 may include various A/V input circuitry, such as, for example, and without limitation, a first video acquirer 121, a second video acquirer 122, an audio acquirer 123, etc., and receives an audio signal or a video signal. The video acquirers 121 and 122 may include various circuitry configured to process a video frame such as a still image, a moving image and the like acquired in a video call mode and a photographing mode. Further, the processed video frame is displayed on a display 151, stored in the storage 160, or transmitted to the outside via the wireless communicator 110. The video acquirers 121 and 122 may include various acquisition circuitry, and the first video acquirer 121 provided in the front of the image processing apparatus 10, and the second video acquirer 122 provided in the back of the image processing apparatus 10. The audio acquirer 123 may include circuitry that receives an external acoustic signal in a call mode and a recording mode through a microphone, and processes it into electric audio data. Further, the audio data processed in the call mode is converted and output to be transmittable to a mobile communication base station via the mobile communication module 112. The audio acquirer 123 may include various circuitry configured to employ various noise reduction algorithms for removing noise generated in receiving an external acoustic signal.

The user input portion 130 may include various input circuitry that generates key-input data corresponding to a user's input for controlling operations of the image processing apparatus 10. The user input portion 130 may include various input circuitry, such as, for example, and without limitation, a key pad, a dome switch, a (capacitive/resistive) touch pad, a jog wheel, a jog switch, a finger mouse, etc. In particular, if the touch pad and the display 151 are mutually layered to form a layer structure, it will be called a touch screen.

The sensing portion 140 may include various sensors and senses an open/close, a position, a posture and the like states of the image processing apparatus 10, and generates a sensing signal for controlling the operations of the image processing apparatus 10. As necessary, the sensing portion 140 may sense whether the power supply 190 is supplied with power, whether the interface portion 170 connects with an external device, etc. The sensing portion 140 may include a proximity sensor 141, a gyro sensor 142, an electronic compass 143, etc. Here, the gyro sensor 142 includes a sensor of using a gyroscope to sense a motion of an object, an inertia sensor, an acceleration sensor, etc., and the electronic compass 143 refers to a sensor of using a magnetic sensor coordinated along the Earth's magnetic field and sensing an orientation.

The output portion 150 includes various output circuitry, such as, for example, and without limitation, the display 151, an acoustic output portion 153, an alarm portion 155, a vibrator 157, etc. to output an audio signal, a video signal or an alarm signal.

The display 151 displays information processed in the image processing apparatus 10. For example, if the image processing apparatus 10 is in the call mode, a user interface (UI) or graphic user interface (GUI) related to a call is displayed. Further, if the image processing apparatus 10 is in the video call mode or the photographing mode, the display 151 displays each or both of photographed and received images, and a related UI or GUI. By the way, if the display 151 and the touch pad are layered to constitute the touch screen, the display 151 may be used as an input portion as well as the output portion. When the display 151 includes the touch screen, it may further include a touch screen panel, a touch screen panel controller, etc.

The display 151 may be achieved by at least one of a liquid crystal display (LCD), a thin film transistor-liquid crystal display (TFT-LCD), an organic light-emitting diode (OLED), a flexible display, a curved display and a 3D display, or the like, but is not limited thereto. Further, two or more displays 151 may be provided in accordance with the types of the image processing apparatus 10. For example, a front display and a back display may be provided in the image processing apparatus 10.

The acoustic output portion 153 may include various circuitry configured to output the audio data received through the wireless communicator 110 in the call mode, the recording mode, etc. or stored in the storage 160. To that end, the acoustic output portion 153 may include various output circuitry, such as, for example, and without limitation, a loudspeaker, a buzzer, etc. The alarm portion 155 outputs a signal for informing that an event occurs in the image processing apparatus 10. The vibrator 157 makes vibrations with various strengths and patterns in accordance with a vibration signal transmitted from the controller 100.

The storage 160 may store programs for processes and control of the controller 100, or may temporarily store data (e.g. a phonebook, a message, a still image, a moving image, etc.) input to or output from the image processing apparatus 10. The storage 160 may be achieved using at least one of a flash memory type, a hard disk type, a multimedia card micro type, a card type memory (e.g. SD or XD memory, etc.), a random access memory (RAM), and a read only memory (ROM). Further, the image processing apparatus 10 may employ a web storage that functions like the storage 160 on Internet.

The interface portion 170 may include various circuitry that serves as an interface for all external devices to be connected to the image processing apparatus 10. As an example of the external device to be connected to the image processing apparatus 10, there are a wired/wireless headset, an external charger, a wired/wireless data port, a memory card), a socket for a card such as a SIM/UIM card, an audio input/output (I/O) terminal, a video input/output (I/O) terminal, an earphone, etc.

The controller 100 may include various processing circuitry, such as, for example, and without limitation, a central processing unit (CPU) or a processor, and controls operations of the elements in the image processing apparatus 10.

The signal processor 180 may include various processing circuitry, such as, for example, and without limitation, an image processor and perform various processes with regard to data/a signal. For example, if video data is received in the wireless communicator 110, the video acquirers 121 and 122 or the interface portion 170, the signal processor 180 performs video processing processes to the video data, and outputs the processed video data to the display 151 so that the display 151 can display an image based on the video data. If a broadcast signal is received, the signal processor 180 extracts video, audio and additional data from the broadcast signal tuned to a specific channel, and adjusts an aspect ratio of the extracted video data to be displayed on the display 151. There are no limits to the kind of video processing processes performed in the signal processor 180 or the various circuitry that may be configured to perform the various processes. For example, the video processing processes may include decoding corresponding to a video format of video data, de-interlacing for converting interlaced video data into progressive data, scaling for adjusting video data in accordance with preset resolutions, noise reduction for improving image quality, detail enhancement, frame refresh rate conversion, etc. The signal processor 180 implements various processes in accordance with the kinds and characteristics of data. Therefore, the process to be implemented in the signal processor 180 is not limited to the video processing process. The signal processor 180 may be given in the form of a system on chip (SOC) by integrating with the controller 100, but not limited thereto. Alternatively, the signal processor 180 may integrate with another element or may be independently provided.

The power supply 190 receives external power or internal power under control of the controller 100 and supplies power needed for operating the elements.

Figure 2:
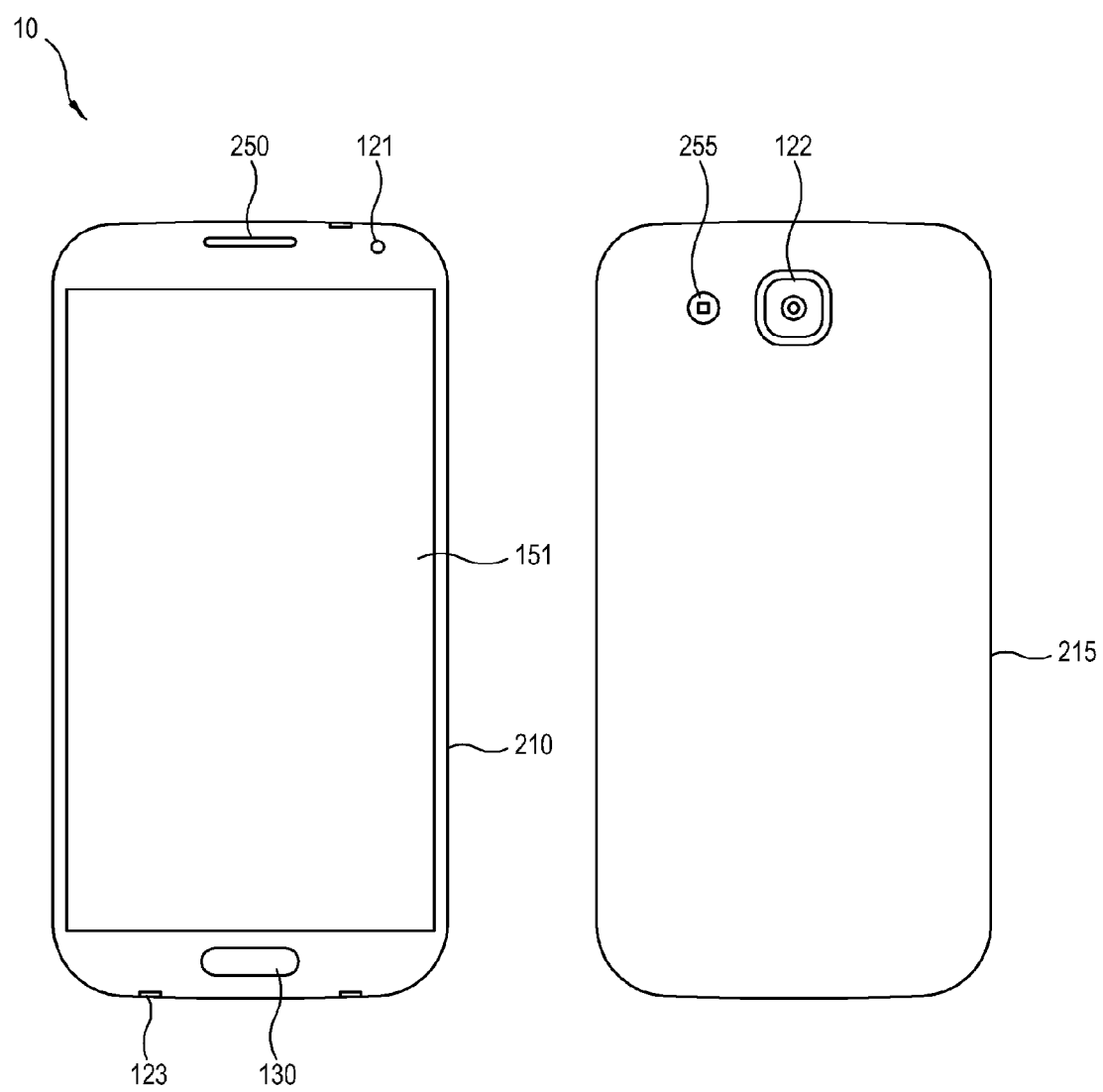
FIG. 2 is a diagram illustrating an example of the image processing apparatus of FIG. 1.

FIG. 2 is a diagram illustrating an example of the image processing apparatus of FIG. 1. Referring to FIG. 2, the image processing apparatus 10 in this example embodiment includes a front case 210 and a back case 215. The front case 210 and the back case 215 form an outer appearance of the image processing apparatus 10. Between the front and back cases 210 and 215, at least one middle case may be added.

The display 151, the user input portion 130, the audio acquirer 123, a first acoustic output portion 250 and the first video acquirer 121 may be arranged on the front case 210. Further, a second acoustic output portion 255 and the second video acquirer 122 may be arranged on the back case 215.

The display 151 includes an LCD, an OLED or the like to visually display information, and may serve as the touch screen for receiving a user's touch as a user's input.

The user input portion 130 may employ any tactile manner as long as it is controlled using a user's tactile input. For example, the user input portion 130 may include various input circuitry, such as, for example, and without limitation, a dome switch or a touch pad to receive a user's push or touch as a command or information; a wheel or jog key to be rotated; a joystick or the like. The user input portion 130 may be used to issue a command for starting and terminating the image processing apparatus 10 or making a call through the image processing apparatus 10, may be used to input selection for an operation mode, or may be used as a hot key for activating a specific function of the image processing apparatus 10. However, the functions of the user input portion 130 may be replaced by the display 151 serving as the touch screen.

The first video acquirer 121 is provided in the front of the image processing apparatus 10 and takes a frontward image. On the other hand, the second video acquirer 122 is provided in the back of the image processing apparatus 10 and takes a backward image. Each of the first video acquirer 121 and the second video acquirer 122 may include a lens, an image sensor, etc. The first video acquirer 121 and the second video acquirer 122 are configured to output video signals input through their lenses to the signal processor 180 under control of the controller 100. The audio acquirer 123 may be suitable for acquiring a user's voice and other sounds.

Figure 3:
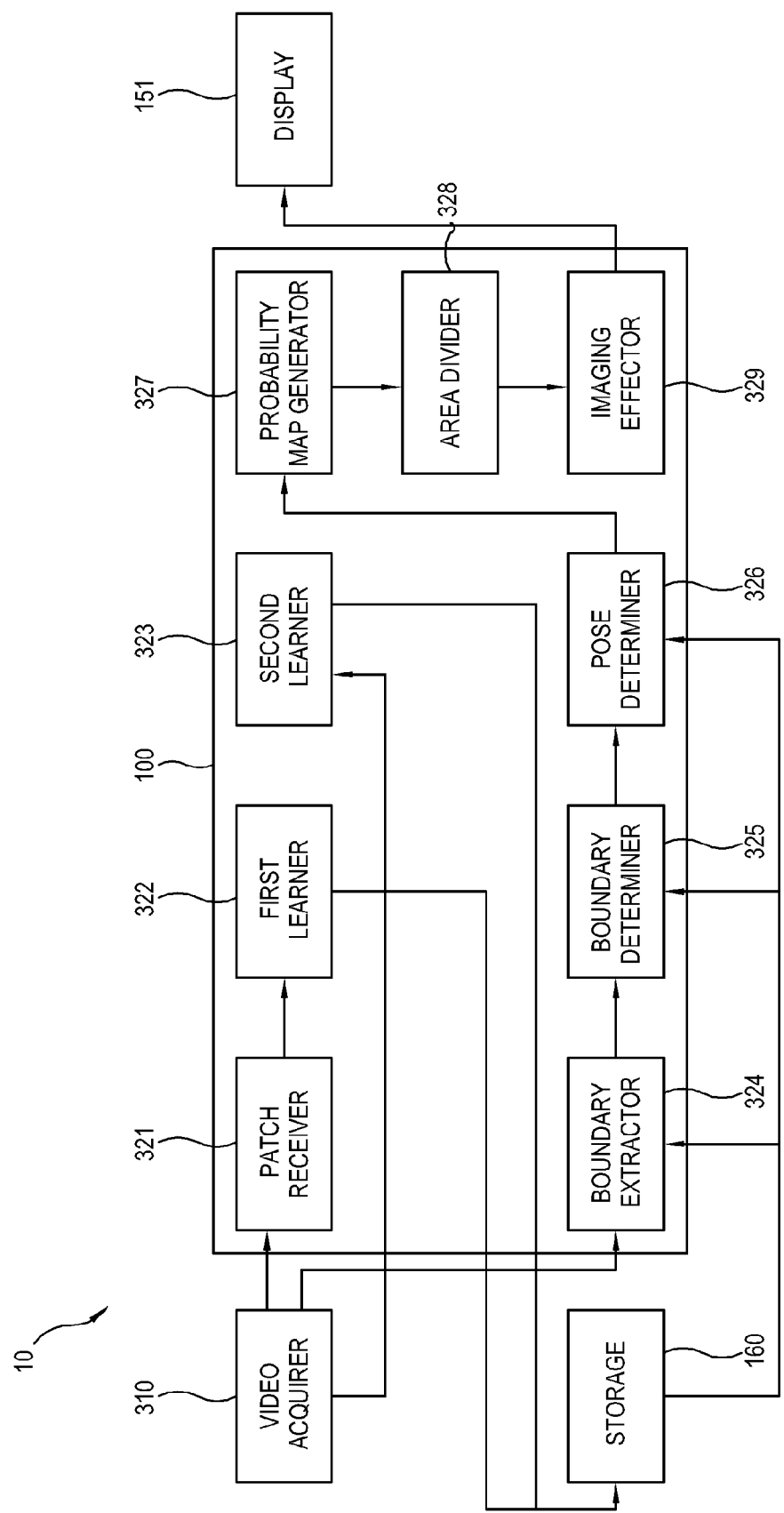
FIG. 3 is a block diagram illustrating example functions of the image processing apparatus of FIG. 1.

FIG. 3 is a block diagram illustrating example functions of the image processing apparatus of FIG. 1. Referring to FIG. 3, the image processing apparatus 10 in this example embodiment includes a video acquirer (e.g., including video acquiring circuitry) 310, the controller (e.g., including processing circuitry and various program modules) 100, the storage 160, and the display 151. Here, the controller 100 may further include a patch receiver 321, and various program modules including, but not limited to, a first learner 322, a second learner 323, a boundary extractor 324, a boundary determiner 325, a pose determiner 326, a probability map generator 327, an area divider 328 and an imaging effector 329.

The video acquirer 310 may include a lens, an image sensor, etc. and acquire an image from the exterior. The video acquirer 310 may include a plurality of video acquirers 121 and 122.

The patch receiver 321 receives an image, patches, etc. from the video acquirer 310. If the patch receiver 321 receives an image, it divides the received image into predetermined areas or grids to thereby generate patches. Here, the patch is a part of the image, which refers to an image including at least one between a person area corresponding to a person and a background area excluding the person area. The patch may be a part of an image obtained from an Internet search result with regard to a word such as a 'human' or a 'person' or stored in the storage 160. The patch receiver may be realized using hardware, software or a combination thereof.

The first learner 322 uses various image recognition algorithms such as convolution neural networks (CNN), histogram of oriented gradient (HOG), etc., and detects a characteristic point of the patch. The first learner 322 uses first reference information about a characteristic of a person and determines whether the person area is included in the patch in accordance with whether the detected characteristic point matches with a characteristic of a person. Here, the first reference information may be reference information previously stored in the storage 160.

For example, the first learner 322 uses the first reference information about a face shape and a face position of a person to estimate the face pattern and the face position from the detected characteristic point, and determines whether the patch includes the person area based on the estimated face pattern and face position.

The first learner 322 determines whether the patch includes the person area with respect to a plurality of patches, and thus learns a characteristic of a person. If the face pattern and the face position included in the patch are learned by determining that the patch includes the person area based on the first reference information about the face pattern and the face position, the learned face pattern and face position are used as the first reference information about the characteristic of the person for determining whether the next patch includes the person area.

Thus, the first learner 322 uses the first reference information for learning a characteristic of a person from the patches, and determines whether the patch includes the person area in accordance with the learned results. The first learner 322 may store the learned results in the storage 160.

The second learner 323 may use various image recognition algorithms to extract a sample boundary from a sample image. Here, the sample image may be an image about a part of a person, and the sample boundary may be a boundary about a part of a person. Further, the sample image may be an image received from the video acquirer 310, an image stored in the storage 160, or an image obtained from Internet search results.

The second learner 323 may group a sample boundary extracted using second reference information previously determined by a user. Here, the second reference information may information about a reference boundary showing a partial section in a profile of a person, which may be previously determined by a user and stored in the storage 160 or obtained from an external device. Since the reference boundary refers to a partial section in a profile of a person, a partial profile of a body and a partial profile of clothes. For example, the reference boundary may include a person's head line, jawline, neckline, shoulder line or the like partial profile of a body or may include or an outerwear line, a hat line or the like partial profile of clothes. Further, the reference boundary may be classified according to poses of a person. For example, the reference boundary may be prepared according to left and right shoulder lines in a frontal pose and left and right shoulder lines in an oblique pose.

The second learner 323 groups a standard boundary in accordance with a partial section of a person classified according to poses, and learns the partial section of the person classified according to poses. Here, matching between the boundaries may be determined based on predetermined similarity, and the predetermined similarity is given by taking the lengths of straight and curved line components in the boundaries, a bending angle, etc. into account. For example, supposes that the left and right shoulder lines in the oblique pose are determined as the reference boundary for the left and right shoulder lines, and the second reference information about the reference boundary is stored in the storage 160. The second learner 323 extracts a plurality of sample boundaries from a plurality of sample images, and groups multiple sample boundaries respectively corresponding to the reference boundaries about the left and right shoulder lines in the oblique pose among the plurality of sample boundaries based on the second reference information, thereby learning the left and right shoulder lines in the oblique pose.

However, a grouping type for the learning is not limited to the foregoing description. Thus, the second learner 323 may determine a partial profile of a body in various poses as the reference boundary, and may determine a partial profile of various clothes as the reference boundary. Therefore, the second learner 323 can learn the boundary of the person area according to various types in accordance with whether the boundary matches with various reference boundaries.

Here, the second learner 323 may use a natural language algorithm such as latent dirichlet allocation (LDA) to learn the boundary of the person area. That is, the grouped sample boundaries may refer, for example, to probability distribution about the boundary of the person area.

The second learner 323 generates model information abased on the boundary of the learned person area, and stores the generated model information in the storage 160. Since the boundary of the person area is learned according to various categories such as poses of a person, a part of a body, the kind of clothes, etc., the model information may be also prepared according to various types.

The image processing apparatus 10 according to an example embodiment may learn a characteristic of a person based on the first reference information, and learn the boundary of the person area based on the second reference information.

Below, a process of determining whether an input image from the outside includes a person area based on the learned characteristic of the person, determining a pose of a person area based on the learned boundary of the person area, and extracting the person area from the input image will be described in detail.

The boundary extractor 324 receives an input image from the video acquirer 310 and extracts a boundary from the input image through various image recognition algorithms.

The boundary extractor 324 determines whether the input image contains a person, using learning results about a characteristic of a person. That is, the boundary extractor 324 determines whether the input image includes the person area in accordance with whether the boundary of the input image matches with the learned characteristic of the person. Thus, the boundary extractor 324 distinguishes between an image including the person area and an image excluding the person area.

The boundary determiner 325 receives an input image determined as an image including the person area by the boundary extractor 324 among a plurality of input images. The boundary determiner 325 determines a boundary suitable for selecting the type of model information among the boundaries extracted from the input image. To extract a person area (hereinafter, referred to as a 'target area') from the input image, the model information is used to compare the boundary of the target area and the learned boundary of the person area. Since the model information is related to a partial profile of a body in each pose, there is a need of determining the boundary of the target area, e.g., a partial boundary for selecting the type of model information among the boundaries of the input image.

Thus, the boundary determiner 325 divides the boundary of the input image into partial sections of a body or partial sections of clothes, and determines the divided boundary as the boundary of the target area. For example, the boundary determiner 325 divides the boundary of the input image into a head line, a shoulder line, etc. and determines the shoulder line as the boundary of the target area among the divided boundaries.

For example, the boundary determiner 325 may determine a boundary having a large change in shape as the boundary of the target area among the plurality of divided boundaries. The larger the change in the shape of the boundary, the easier it is to distinguish from the other divided boundaries but also the comparison with the learned boundary of the target model information. For example, if the boundary of the input image includes left and right shoulder lines, one shoulder line having a larger change in distance along a predetermined axial direction may be determined as the boundary of the target area.

The pose determiner 326 may select the model information based on a characteristic of the boundary of the target area. In other words, the pose determiner 326 may select the model information suitable for comparison based on the length of straight and curved line components, the bending angle between the components, etc. of the boundary of the target area. The pose determiner 326 may determine the pose of the target area in accordance with whether the boundary of the target area matches with the learned boundary of the person area based on the selected model information.

Since the model information is obtained by grouping a partial boundary of a person in accordance with poses, the pose determiner 326 determines whether the boundary of the target area and the learned boundary of the person area match with each other in accordance with whether the boundary of the target area is included in the model information. In particular, the pose determiner 326 determines a pose of a person in the target area when the boundary of the target area matches with the learned boundary of the person area. In the foregoing example, if one shoulder line having a larger change in distance along a predetermined axial direction is the boundary of the target area and the boundary of the target area matches with the should liner learned in the oblique pose, the pose determiner 326 may determine the person in the target area has an oblique pose.

After the pose of the person in the target area is determined, the probability map generator 327 generates a probability map about the target area based on the determined pose. Based on the determined boundary of the target area and the probability map, the area divider 328 extracts the target area from the input image. The area divider 328 may use Grab-Cut or least mean square (LMS) algorithm to extract the target area. The imaging effector 329 may apply an image processing function for the person area to the target area. For example, an out-of-focus effect may be applied to an area of the input image excluding the target area.

The image processing apparatus 10 according to an example embodiment easily extracts a target area from only a single input image by determining a pose of a person contained in an input image, and as necessary applies an imaging effect to the extracted target area to be displayed on the display 151.

Figure 4:
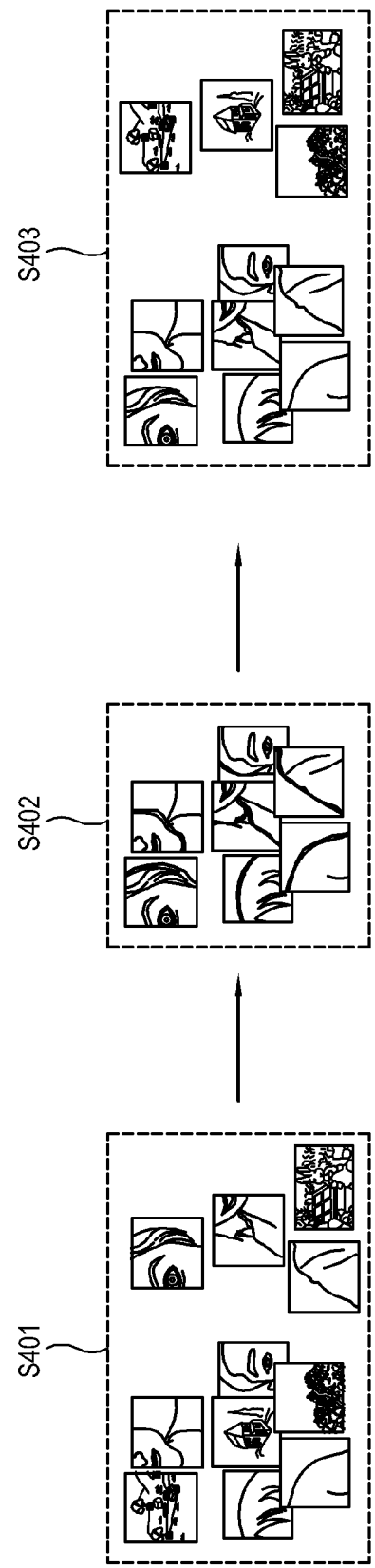
FIG. 4 is a diagram illustrating an example of learning a person area based on patches.

FIG. 4 is a diagram illustrating an example of learning a person area based on patches. Referring to FIG. 4, the controller 100 according to an example embodiment receives a plurality of patches, and detects characteristic points from the received patches (S401). The patch may refer to a part of an image including at least one of the person area and the background area, and the controller 100 may use various image recognition algorithms to detect the characteristic points of the patches.

The controller 100 uses the first reference information about the characteristic of the person to determine whether the patch includes the person area based on whether the detected characteristic points match with the characteristics of the person, and learns the characteristic of the person (S402). Here, the first reference information may be information about a characteristic of a person previously determined by a user.

For example, the controller 100 may use the first reference information about a face boundary of a person to determine whether the characteristic points of the patches correspond to the face boundary. The controller 100 determines whether the characteristic points detected from the plurality of patches correspond to the face boundary, and learns the plurality of characteristic points determined to correspond to the face boundary.

The controller 100 uses the results from learning the characteristic of the person to determine whether an input image contains a person when the image is input (S403).

Figure 5:
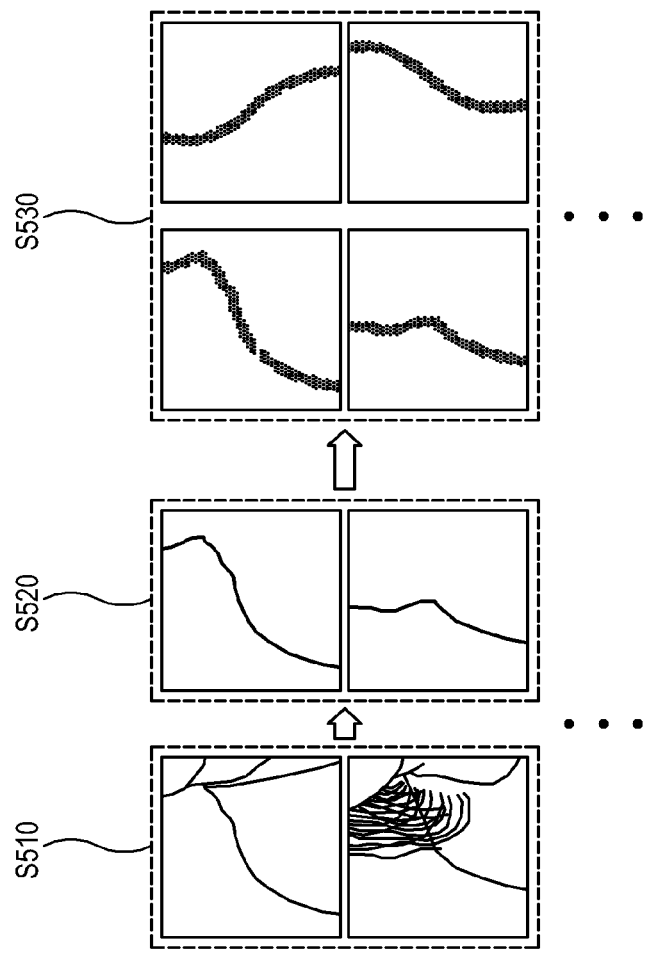
FIG. 5 is a diagram illustrating an example of learning a boundary of the person area.

FIG. 5 is a diagram illustrating an example of learning a boundary of the person area. Referring to FIG. 5, the controller 100 in this example embodiment receives a plurality of sample images and extracts a sample boundary through the image recognition algorithms (S510). Here, the sample image may be an image including a part of a person, which may be stored in the storage 160 or acquired from an external device. The sample boundary may refer to a boundary extracted from the sample image.

The controller 100 uses the second reference information to group a plurality of sample boundaries according to types. Here, the second reference information may be information about a reference boundary showing a partial profile of a body classified according to poses of a person, may be a reference boundary corresponding to a part of the person area, or may be previously determined by a user and stored in the storage 160 or acquired from an external device.

The controller 100 classifies the sample boundary according to various types in accordance with whether the sample boundary matches with the reference boundary (S520). For example, if the reference boundary is prepared by a face line and a shoulder line in an oblique pose, the controller 100 classifies a plurality of standard boundary into a face line, a shoulder line, etc. in an oblique pose in accordance with whether the lengths of the straight and curved line components of the standard boundary, the bending angle, etc. match with the face line and the shoulder line of the reference boundary.

The controller 100 groups various types of the sample boundary according to types, learns the boundary of the person area, and generates the model information about the learned boundary of the person area (S530). In the foregoing example, the controller 100 learns the should line in the oblique pose by grouping a plurality of sample boundaries classified into the shoulder lines in the oblique pose. Thus, the grouped sample boundary may be used as the probability distribution about the multiple boundaries of the person area.

The controller 100 determines a pose of a person included in an input image based on the model information, and extracts the person area based on the determined pose.

Below, a process of determining whether an input image contains a person area, and extracting the person area by applying the model information to the input image including the person area will be described in greater detail with reference to FIG. 6.

Figure 6:
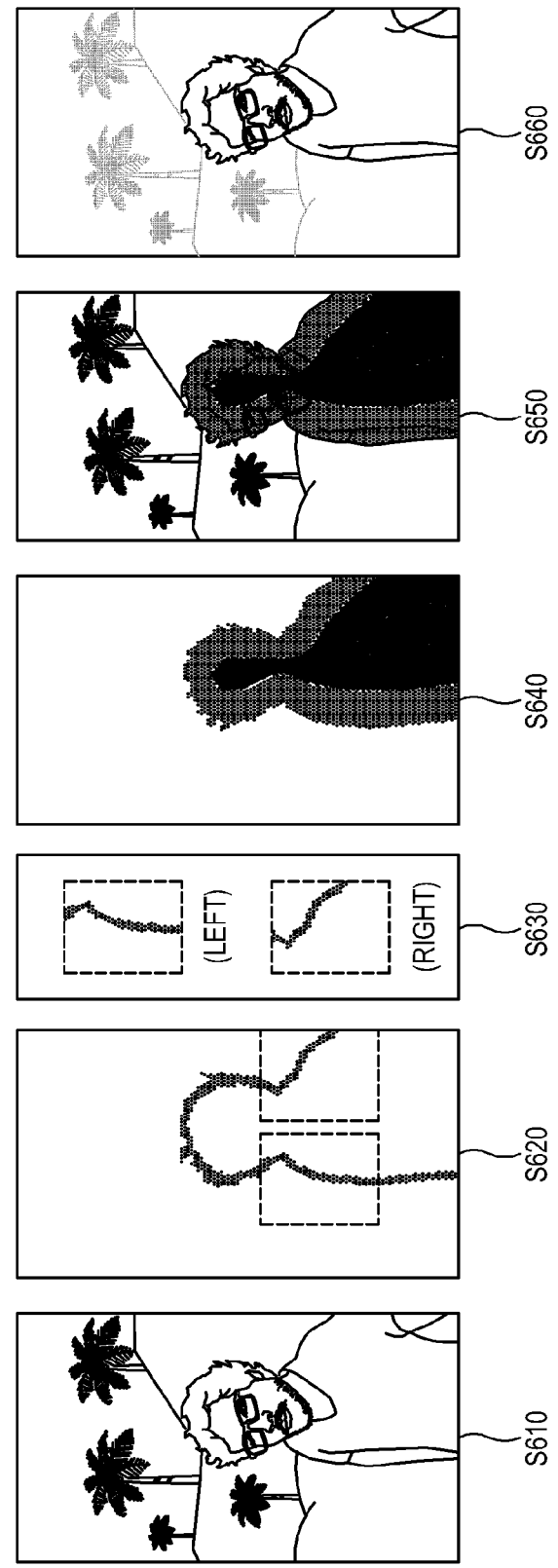
FIG. 6 is a diagram illustrating an example of extracting a target area.

FIG. 6 is a diagram illustrating an example of extracting a target area. Referring to FIG. 6, the image processing apparatus 10 in this example embodiment receives an input image including at least one target area (S610). Here, the target area may refer to an area corresponding to a person. The controller 100 determines whether the input image contains a person based on results from learning a characteristic of a person. That is, the controller 100 detects characteristic points of the input image through various image recognition algorithms, and separates only the input image containing a person in accordance with the detected characteristic points match with the learned characteristic of a person.

The controller 100 extracts a boundary from the input image in order to extract the target area from the input image, and determines the boundary of the target area for selecting a type of model information among the extracted boundaries (S620). Since the model information has been learned with regard to a partial boundary of a person according to poses of a person, the boundary of the target area may be also a partial boundary of a person to select a type of model information. Thus, the controller 100 may determine a partial boundary of a body or a partial boundary of clothes among the boundary of the input image as the boundary of the target area to determine the type of model information.

There may be multiple boundaries of the target area. In this case, the controller 100 preferentially selects the model information suitable for comparison with a boundary having a large change in shape among the boundaries of the target area, and determines whether the boundary of the target area matches with the learned boundary of the person area based on the selected model information (S630). If the boundary of the target area matches with the learned boundary of the person area, the controller 100 determines a pose of a person in the target area. This is because the boundary of the person area has been learned with regard to a partial boundary of a person according to poses.

The controller 100 generates a probability map about the target area based on the determined pose (S640). The controller 100 may extract the target area from the input image based on the determined boundary of the target area and the generated probability map (S650). The controller 100 may use the Grab-Cut or LMS algorithm to extract the target area.

The controller 100 may apply a predetermined image processing function for the person area to the extracted target area (S660). For example, an out-of-focus effect may be applied to an area of the input image excluding the target area.

Like this, the controller 100 according to an example embodiment determines whether an input image contains a person based on results of learning a characteristic of a person, and determines a pose of a person in the input image based on the boundary of the person area learned according to poses.

Figure 7:
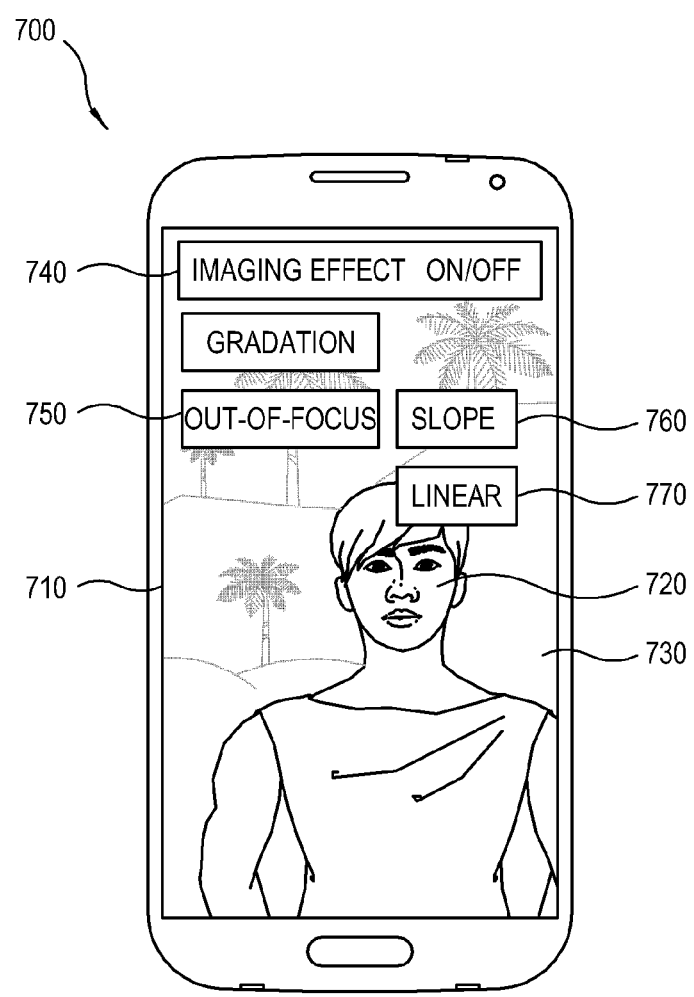
FIGS. 7, 8, 9, 10 and FIG. 11 are diagrams illustrating examples of image processing in the image processing apparatus of FIG. 1.

FIGS. 7, 8, 9, 10 and FIG. 11 are diagrams illustrating examples of image processing in the image processing apparatus 10 of FIG. 1. Referring to FIG. 7, an image processing apparatus 700 equivalent to the image processing apparatus 10 of FIG. 1 displays an input image, which contains a target area 720 and a background area 730, on the display 710. The image processing apparatus 700 extracts the target area 720 from the input image, and applies the out-of-focusing effect to the background area 730 excluding the target area 720.

The controller 100 of the image processing apparatus 700 may control the display 710 to display a UI about whether an imaging effect is applied to the background area 730 and the kind of imaging effects. For example, the image processing apparatus 700 may display a UI 740 including an icon for turning on/off the imaging effect to be applied to the background area 730, and a UI 750 including icons about the kind of imaging effects such as gradation, out-of-focusing, etc. If the icon 750 of the out-of-focusing is selected by a user's input, the image processing apparatus 700 further displays a UI 760 including icons about how far the out-of-focusing effect will be applied. For example, the image processing apparatus 700 may show a slope icon 760 for applying an out-of-focusing effect varied depending on a distance from the boundary of the target area 720, and a linear icon 770 for applying the out-of-focusing effect regardless of the distance from the boundary of the target area 720.

Like this, the image processing apparatus 700 selects whether to apply the imaging effect to the background area 730, the kind of imaging effects, and how far the imaging effect will be applied, in response to a user's input using the UI.

Figure 8:
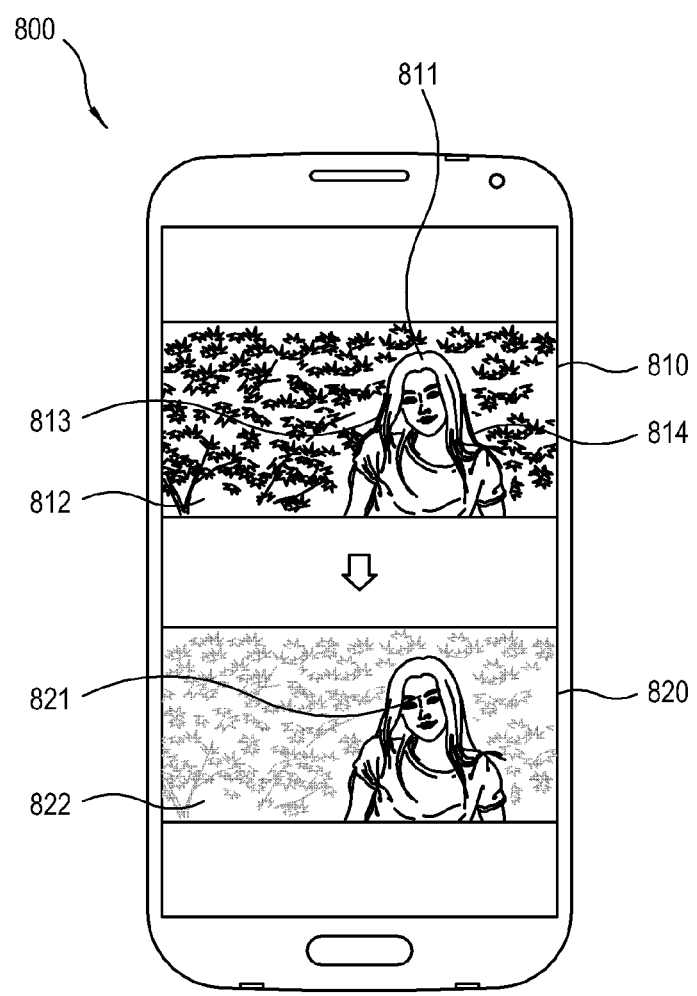

Referring to FIG. 8, an image processing apparatus 800 equivalent to the image processing apparatus 10 of FIG. 1 learns a boundary of a person area in consideration of a boundary varied depending on clothes wearing in a person area. That is, the image processing apparatus 800 may classify and group the boundary of the person area extracted from a plurality of sample images according to whether a person wears clothes, and may classify and group the boundary of the person area according to the kind of clothes. For example, the image processing apparatus 800 classifies and groups the boundary of the person area where a person wears thin clothes and classifies and groups the boundary of the person area where a person wears thick clothes.

Like this, the image processing apparatus 800 learns the boundary of the person area according to clothes wearing and the kind of clothes, generates the model information about the learned boundary of the person area, and stores the generated model information in the storage. Thus, the image processing apparatus 800 determines whether the boundary of the target area matches with the learned boundary of the person area based on the model information even though a person in the target area wears various kinds of clothes.

Referring back to FIG. 8, the image processing apparatus 800 receives and displays an input image 810, and the input image 810 includes a target area 811 and a background area 812. The image processing apparatus 800 extracts the boundary of the target area 811 through the image recognition algorithm, and determines a left boundary 813 and a right boundary 814 of the target area based on a sample image.

The image processing apparatus 800 determines whether the left boundary 813 and the right boundary 814 of the target area 811 determined based on the model information matches with the learned boundary of the person area. Since the learned boundary of the person area has been learned according to clothes wearing and the kind of clothes and the model information is related to the learned person area, the image processing apparatus 800 determines whether the left boundary 813 and the right boundary 814 match with the boundary of the person area learned in case of wearing thick clothes.

If it is determined that the left boundary 813 and the right boundary 814 match with the learned boundary of the person area, the image processing apparatus 800 determines a pose of a target area 821. Here, if a distance in a predetermined axial direction between the left boundary 813 and the right boundary 814 is equal to or smaller than a predetermined threshold, the target area 821 has a frontal pose.

The image processing apparatus 800 generates a probability map about the target area 821 based on the determined pose of the target area 821. The image processing apparatus extracts the target area 821 based on the boundary of the target area 811 and the probability map, and displays an image 820 obtained by applying an out-of-focusing effect to a background area 822 excluding the target area 821.

Figure 9:
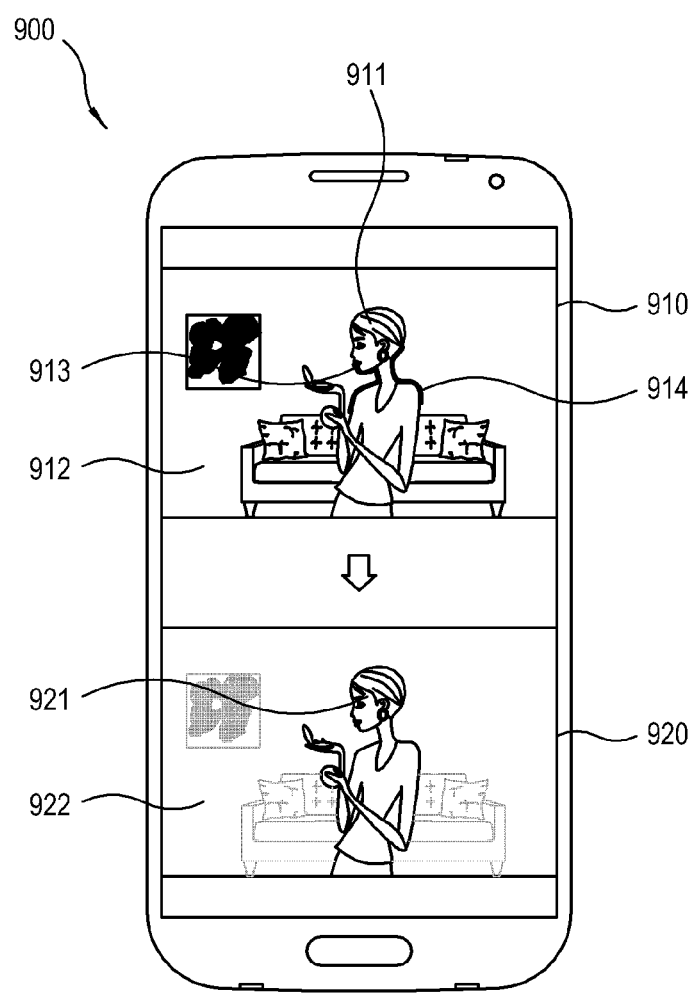

Referring to FIG. 9, an image processing apparatus 900 corresponding to the image processing apparatus 10 of FIG. 1 learns a boundary of a person area in consideration of change in the boundary according to poses of the person area. That is, the image processing apparatus 900 determines a pose based on the boundary of the person area extracted from a plurality of sample images, and classifies and groups the boundary of the person area according to the determined poses.

For example, if a jaw line at a left side and a neck line at a right side are extracted within the person area, the image processing apparatus 900 determines that the person area has an oblique pose, and classifies and groups the boundary of the person area according to the determined poses, thereby learning the boundary of the person area having the oblique pose. The image processing apparatus 900 generates and stores the model information about the learned boundary of the person area.

Referring back to FIG. 9, the image processing apparatus 900 receives and displays an input image 910, and the input image includes a target area 911 and a background area 912. The image processing apparatus 900 extracts the boundary of the target area 911 through the image recognition algorithm, and determines a left boundary 913 and a right boundary 914 based on the sample image.

If it is determined that the left boundary 913 and the right boundary 914 of the target area 911 match with the learned boundary of the person area, the image processing apparatus 900 determines a pose of the target area 911 and generates a probability map about the target area 911 based on the determined pose. The image processing apparatus 900 extracts a target area 921 based on the extracted boundary of the target area 911 and the probability map. The image processing apparatus 900 may implement a function corresponding to the person area with respect to the extracted target area 921. For example, the image processing apparatus 900 may display an image 920 obtained by applying an out-of-focusing effect to the background area 922 excluding the target area 921.

Figure 10:
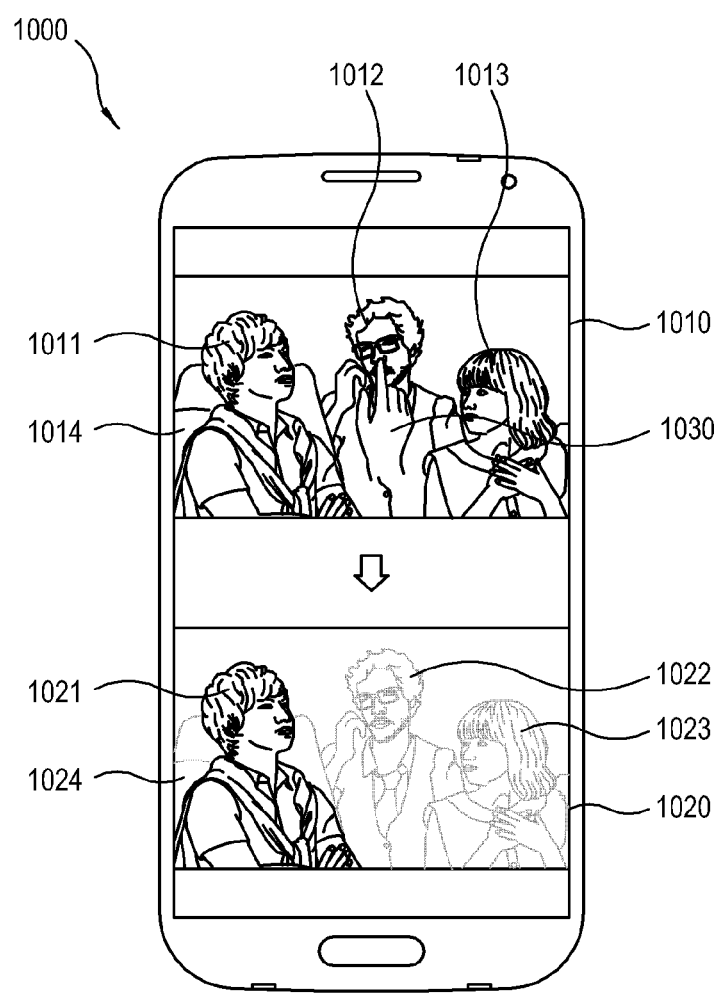

Referring to FIG. 10, an image processing apparatus 1000 equivalent to the image processing apparatus 10 of FIG. 1 learns the boundary of the person area by taking change in the boundary of the person area into account. In other words, the image processing apparatus 1000 may group boundaries of person areas extracted from a plurality of sample images.

Like this, the image processing apparatus 1000 learns the boundary of the person area, and stores the model information about the learned boundary of the person area. Thus, the image processing apparatus 1000 determines whether the boundary of the target area matches with the learned boundary of the person area based on the model information and the learned boundary of the person area.

Referring back to FIG. 10, the image processing apparatus 1000 receives and displays an input image. The input image includes a first target area 1011, a second target area 1012 and a third target area 1013 together with a background area 1014. The image processing apparatus 1000 extracts the boundaries of the multiple target areas through the image recognition algorithm, and determines each boundary of the target areas according to the model information based on the sample image.

The image processing apparatus 1000 determines whether the determined boundary of each target area matches with the learned boundary of the person area. If it is determined that the determined boundary of each target area matches with the learned boundary of the person area, the image processing apparatus 1000 generates a probability map about each target area, and extracts each of the target areas 1011, 1012 and 1013 based on the boundaries of the respective target areas and the probability map. The image processing apparatus 1000 may display an image 1010 obtained by applying an out-of-focusing effect to the background area 1014 excluding the respective extracted target areas 1011, 1012 and 1013.

In particular, the image processing apparatus 1000 may include a display capable of receiving a user's touch input, and display a UI for applying the out-of-focusing effect to the target area selected by a user's input. If a user's input 1030 for selecting two areas 1012 and 1013 among the target areas 1011, 1012 and 1013 is received through the UI displayed on the display, the image processing apparatus 1000 may display an image 1020 obtained by applying the out-of-focusing effect to the selected target areas 1022 and 1023 with the background area 1024, excluding the target area 1021.

Figure 11:
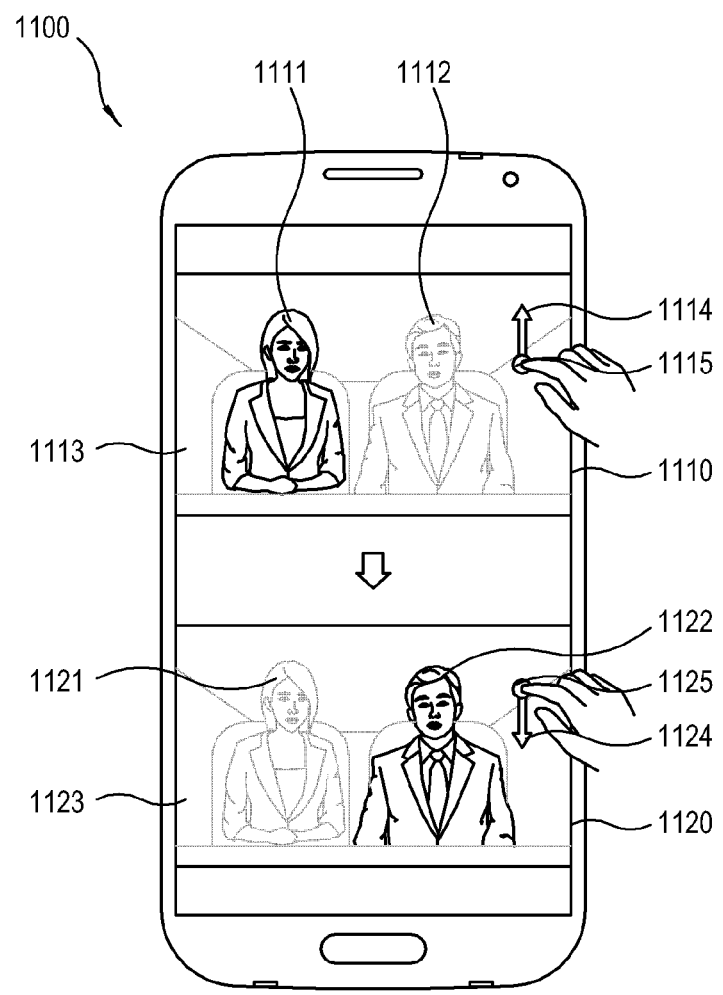

Referring to FIG. 11, an image processing apparatus 1100 receives and displays an input image, and the input image displays a first target area and a second target area together with a background area.

The image processing apparatus 1100 extracts boundaries of multiple target areas through the image recognition algorithm, and determines the boundary of each target area according to model information based on a sample image. The image processing apparatus 1100 determines whether the determined boundary of each target area matches with the learned boundary of the person area.

If it is determined that the determined boundary of each target area matches with the learned boundary of the person area, the image processing apparatus 1100 generates a probability map about each target area and extracts target areas 1111 and 1112 based on the boundaries of the respective target areas and the probability map. The image processing apparatus 1100 displays an image 1110 obtained by applying an out-of-focusing effect to a background area 1113 excluding the extracted target areas 1111 and 1112.

In particular, the image processing apparatus 1100 may control the display to display a UI including a scroll bar for selecting the target area to which the out-of-focusing effect is applied and adjusting how far the out-of-focusing effect will be applied. For example, if the scroll bar 1115 displayed on the display is dragged in an upward direction 1114, the out-of-focusing effect is applied to both the background area 1113 and the second target area 1112. On the other hand, if the scroll bar 1125 is dragged in a downward direction 1124, the out-of-focusing effect is applied to both the background area 1123 and the first target area 1121 and not target area 1122 of image 1120. In addition, the out-of-focusing effect may be differently applied according to a distance of dragging the scroll bar 1115, 1125.

As described above, according to an example embodiment, there are provided an image processing apparatus and a method of controlling the same, in which only a person area is easily extracted from only a single photographed image.

Although various example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. An image processing apparatus comprising:
a storage configured to store model information regarding a plurality of sections obtained by dividing a boundary of a person area in an image; and
a controller implemented by a processor configured to:
identify a boundary of a target area in an image to be processed,
divide the boundary of the target area into a plurality of sections,
identify a section having a large change in shape from among the plurality of sections of the target area, and
based on the identified section of the target area matching a section of the person area from among the plurality of sections of the person area, perform image processing on the target area for the person area.

2. The image processing apparatus according to claim 1, wherein the controller is further configured to learn a plurality of sample images comprising the person area and group the model information based on types based on the learning.

3. The image processing apparatus according to claim 2, wherein the type of model information comprises a pose of a person.

4. The image processing apparatus according to claim 2, wherein the controller is configured to identify the type of model information based on a characteristic in the boundary of the target area.

5. The image processing apparatus according to claim 1, wherein the controller is configured to identify a pose of a person within the target area.

6. The image processing apparatus according to claim 5, wherein the controller is configured to generate a probability map regarding the target area based on the identified pose of the person in the target area, and to extract the target area based on the generated probability map.

7. The image processing apparatus according to claim 1, further comprising a display,
wherein the controller is configured to select at least one among a plurality of target areas included in the image to be processed, and control the display to display a user interface for making the selected target area undergo the image processing for the person area.

8. A method of controlling an image processing apparatus, the method comprising:
storing model information regarding a plurality of sections obtained by dividing a boundary of a person area in an image;
identifying a boundary of a target area in an image to be processed;
dividing the boundary of the target area into a plurality of sections;
identifying a section having a large change in shape from among the plurality of sections of the target area; and
based on the identified section of the target area matching a section of the person area from among the plurality of sections of the person area, performing image processing on the target area for the person area.

9. The method according to claim 8, wherein the storing model information further comprises learning a plurality of sample images comprising the person area and grouping the model information based on types based on the learning.

10. The method according to claim 9, wherein the type of model information comprises a pose of a person.

11. The method according to claim 9, wherein the identifying a boundary of a target area further comprises identifying the type of model information based on a characteristic in the boundary of the target area.

12. The method according to claim 8, wherein the identifying a section having a large change in shape further comprises identifying a pose of a person within the target area.

13. The method according to claim 12, further comprising:
generating a probability map regarding the target area based on the identified pose of the person in the target area; and
extracting the target area based on the generated probability map.

14. The method according to claim 8, further comprising:
selecting at least one among a plurality of target areas included in the image to be processed; and
displaying a user interface for making the selected target area undergo the image processing for the person area.

* * * * *